United States Patent [19]

Binder et al.

[11] Patent Number: 4,514,478

[45] Date of Patent: Apr. 30, 1985

[54] METHOD OF MAKING A POROUS CARBON CATHODE, A POROUS CARBON CATHODE SO MADE, AND ELECTROCHEMICAL CELL INCLUDING THE POROUS CARBON CATHODE

[75] Inventors: Michael Binder, Brooklyn, N.Y.; Eric R. Petersen, Manchester, N.J.; Charles W. Walker, Jr., Freehold, N.J.; William L. Wade, Jr., Neptune, N.J.; Sol Gilman, Rumson, N.J.

[73] Assignee: The United States of America as represented by the Secretary of the Army, Washington, D.C.

[21] Appl. No.: 640,265

[22] Filed: Aug. 13, 1984

[51] Int. Cl.³ .............................................. H01M 6/14
[52] U.S. Cl. .................................... 429/196; 429/218; 29/623.1; 29/623.5
[58] Field of Search ...................... 429/196, 194, 218; 29/623.1, 623.5; 427/58, 115, 122

[56] References Cited

U.S. PATENT DOCUMENTS

| | | | |
|---|---|---|---|
| 3,829,327 | 8/1974 | Omori et al. | 429/218 |
| 4,060,668 | 11/1977 | Goebel | 429/194 X |
| 4,219,443 | 8/1980 | Klinedinst et al. | 429/196 X |
| 4,296,187 | 10/1981 | Barnes et al. | 429/194 X |

Primary Examiner—Charles F. LeFevour
Attorney, Agent, or Firm—Anthony T. Lane; Jeremiah G. Murray; Roy E. Gordon

[57] ABSTRACT

A porous carbon cathode for use in an electrochemical cell is made by wetting the carbon black with a 1:1 to 1:3 mixture of isopropyl alcohol:water, adding a binding agent thereto, smearing the resulting stiff paste on a thin expanded metal screen and pressing and rolling to the desired thickness, drying the cathode sheet in a vacuum oven at about 100° C. for one hour while a weight is placed above and below the cathode sheet which is sandwiched between two pieces of blotting paper, the total weight applied being sufficient for the cathode to retain structural integrity, removing the weight and blotting papers and inserting the cathode sheet in an elevated drying oven at about 280° C. for about one hour, and cooling the cathode sheet between blotting paper, repressing and rolling. Cathodes prepared by this method appear structurally strong, maintain their physical integrity with a minimum of cracking and flaking, and do not crumble when cut. The porous carbon cathode is particularly advantageous when included in a lithium sulfuryl chloride cell, but can be used in any system requiring porous carbon cathodes.

17 Claims, 1 Drawing Figure

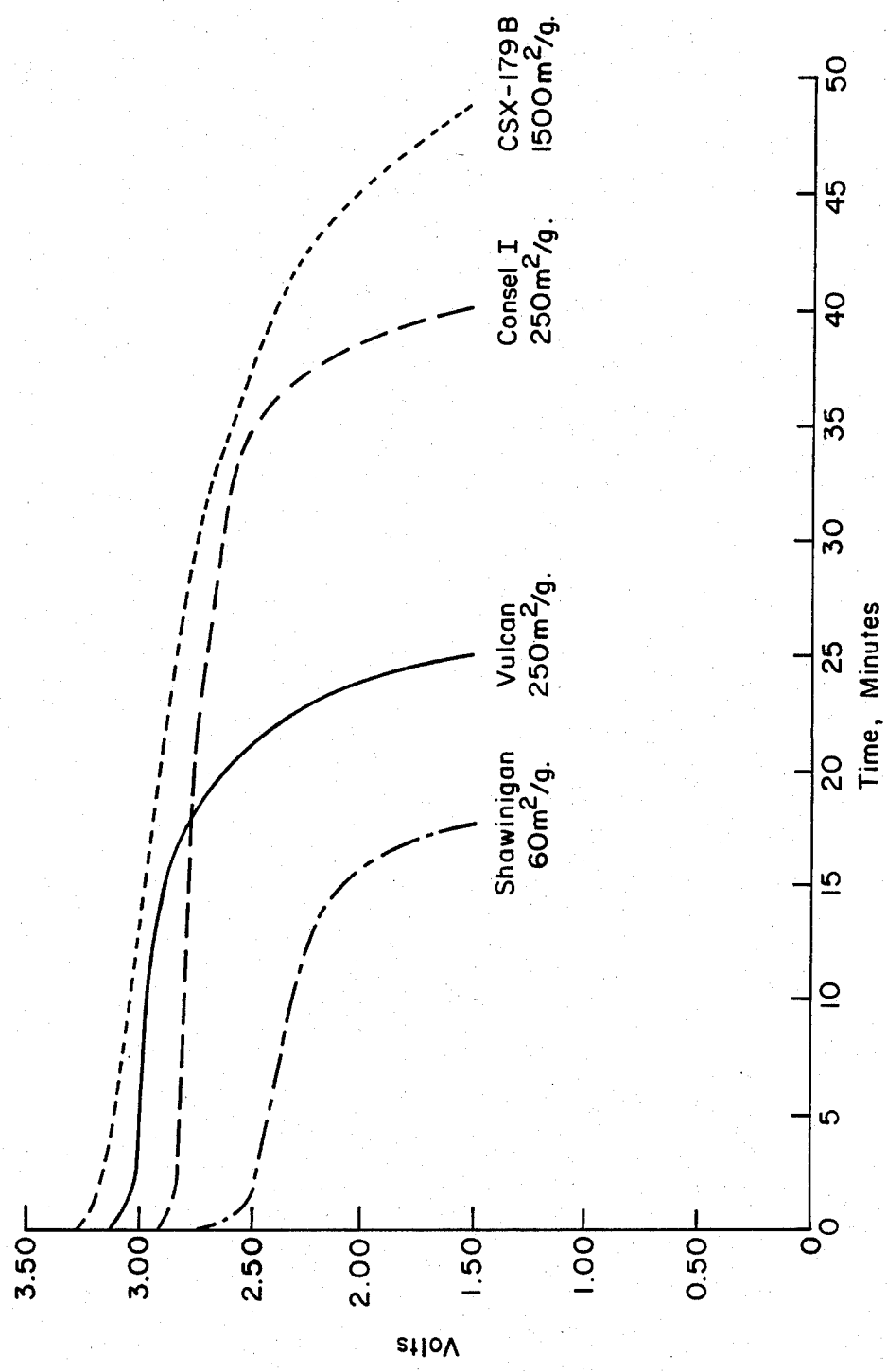

METHOD OF MAKING A POROUS CARBON CATHODE, A POROUS CARBON CATHODE SO MADE, AND ELECTROCHEMICAL CELL INCLUDING THE POROUS CARBON CATHODE

The invention described herein may be manufactured, used and licensed by or for the Government for Governmental purposes without the payment to us of any royalties thereon.

This invention relates to a method of making a porous carbon cathode, to a porous carbon cathode so made, and to an electrochemical cell including the porous carbon cathode.

BACKGROUND OF THE INVENTION

When constructing carbon cathodes for high energy lithium and calcium batteries, carbon black powder is usually mixed with a wetting solvent such as methanol or water, and a binding agent such as polytetrafluoroethylene is added. The resulting stiff paste is smeared on a thin expanded metal screen, pressed and rolled between sheets of blotting paper to the desired thickness, air dried overnight and finally oven dried for one hour at 280° C. Upon cooling, the cathode is repressed and rolled to aid the binder to flow causing cohesion of the carbon particles. The resulting cathode sheets are then cut to the desired size. This fabrication procedure is suitable primarily for carbon blacks with surface areas $\leq 250$ m$^2$/g. Higher area carbon blacks with areas up to 1500 m$^2$/g can not be easily fabricated into cathodes using this method since the polytetrafluoroethylene binder can not adequately coat all of the surface area and resulting carbon cathodes tend to crumble easily when cut and don't stick well to the screen. Although one may improve carbon-screen and carbon-carbon interparticle adhesion by increasing the percentage of polytetrafluoroethylene binder added, this has the undesireable effect of increasing bulk cathode resistance.

Recently there have been theoretical and experimental indications that improved battery performance could result from cathodes constructed with high area carbon blacks. Cathodes have indeed been fabricated from high area carbon black, but the methods used have not always been practical. The cathodes have tended to be small and fragile, and the fabrication method not easily suitable for all types of carbon blacks.

SUMMARY OF THE INVENTION

The general object of this invention is to provide a method for fabricating structually strong porous carbon cathodes that can be used with any carbon black. A further object of the invention is to provide such a method wherein the resulting porous carbon cathode can be used as the cathode in any electrochemical cell. A particular object of the invention is to provide such a method wherein the resulting porous carbon cathode can be used as the cathode in a lithium sulfuryl chloride cell.

It has now been found that the aforementioned objects can be attained by specially treating the carbon black. More particularly, the method of the invention includes the steps of (A) wetting the carbon black with a 1:3 mixture of isopropyl alcohol:water, (B) adding a binding agent thereto, (C) smearing the resulting stiff paste on a thin expanded metal screen and pressing and rolling to the desired thickness, (D) drying the cathode sheet in a vacuum oven at about 100° C. for about one hour while a weight is placed above and below the cathode sheet which is sandwiched between two pieces of blotting paper, (E) removing the weight and blotting paper and inserting the cathode sheet in an elevated drying oven at 280° C. for one hour, and (F) cooling the cathode sheet between blotting paper, repressing, and rolling. The weights act as heat conductors allowing more uniform heating and water removal while maintaining uniform compression of the cathode sheet. This applied pressure does not allow the cathodes to crack as much. Cathodes prepared by this method appear structurally strong, maintain their physical integrity with a minimum of cracking and flaking, and do not crumble when cut. Moreover, the method dramatically reduces the amount of air curing time necessary for the carbon to dry.

DESCRIPTION OF THE DRAWING

The drawing shows comparison high rate discharge curves for lithium sulfurylchloride cells using 1 molar lithium aluminum chloride in sulfuryl chloride as the electrolyte. The lithium cathodes of the lithium sulfuryl chloride cells were constructed with various carbon blacks using the invention method. The advantages of high area carbon black is clearly evident in that for this system, it outperforms its lower area carbon counterparts. Moreover, the invention method can be used without modification for any type of carbon black and at considerable savings of time by not having to wait for overnight drying.

In the method, the concentration of the wetting mixture for the carbon black can be varied from 1:3 isopropyl alcohol:water to 1:1 isopropyl alcohol:water. In lieu of isopropyl alcohol, one may use other lower alcohols such as methanol or ethanol or one can use lower ketones such as acetone.

The binding agent used should be a flexible, elastic polymer such as polytetrafluoroethylene. Such a polymer that is also electrically conducting is especially desired.

In the method, sufficient weight is applied to the cathode sheet during the heating process so that the carbon cathode retains structural integrity. A practical weight is between about 0.1 lb/inch$^2$ of cathode sheet to 2 lbs/inch$^2$ of cathode sheet.

In lieu of blotting paper, any water absorbent material can be used.

We wish it to be understood that we do not desire to be limited to the exact details as described for obvious modifications will occur to a person skilled in the art.

What is claimed is:

1. Method of making a porous carbon cathode for an electrochemical cell, said method including the steps of
   (A) wetting the carbon black with a 1:1 to 1:3 mixture of isopropyl alcohol:water,
   (B) adding a binding agent thereto,
   (C) smearing the resulting stiff paste on a thin expanded metal screen and pressing and rolling to the desired thickness,
   (D) drying the cathode sheet in a vacuum oven at about 100° C. for about one hour while weight is placed above and below the cathode sheet which is sandwiched between two pieces of blotting paper, the total weight applied being sufficient for the cathode to retain structural integrity, (E) removing the weight and blotting paper and inserting the cathode sheet in an elevated drying oven at about 280° C. for about one hour, and (F) cooling the cathode sheet between blotting paper, repressing, and rolling.

2. Method according to claim 1 wherein the carbon black is a higher surface area carbon black with surface areas $\geq 250$ m$^2$/g.

3. Method according to claim 1 wherein the carbon black has a surface area $\leq 250$ m$^2$/g.

4. Method according to claim 1 wherein the binding agent is polytetrafluoroethylene.

5. Method according to claim 1 wherein the electrochemical cell is a lithium sulfuryl chloride cell.

6. Method according to claim 1 wherein the total weight applied to the cathode sheet is between about 0.1 lb per square inch of cathode sheet to about 2 lbs per square inch of cathode sheet.

7. A porous carbon cathode for use in an electrochemical cell, said porous carbon cathode being made by the steps of:

(A) wetting the carbon black with a 1:1 to 1:3 mixture of isopropyl alcohol:water, (B) adding a binding agent thereto, (C) smearing the resulting stiff paste on a thin expanded metal screen and pressing and rolling to the desired thickness, (D) drying the cathode sheet in a vacuum oven at about 100° C. for about one hour while a weight is placed above and below the cathode sheet which is sandwiched between two pieces of blotting paper, the total weight applied being sufficient for the cathode to retain structural integrity, (E) removing the weight and blotting paper and inserting the cathode sheet in an elevated drying oven at 280° C. for one hour, and (F) cooling the cathode sheet between blotting paper, repressing, and rolling.

8. A porous carbon cathode according to claim 7 wherein the carbon black is a higher surface area carbon black with areas $\geq 250$ m$^2$/g.

9. A porous carbon cathode according to claim 7 wherein the carbon black has a surface area $\leq 250$ m$^2$/g.

10. A porous carbon cathode according to claim 7 wherein the binding agent is polytetrafluoroethylene.

11. A porous carbon cathode according to claim 7 for use in a lithium sulfuryl cloride cell.

12. A porous carbon cathode according to claim 7 wherein the total weight applied to the cathode sheet is between about 0.1 lb per square inch of cathode sheet to about 2 lbs per square inch of cathode sheet.

13. An electrochemical cell comprising lithium as the anode, a solution of 1 molar lithium aluminum chloride in sulfuryl chloride as the electrolyte and a porous carbon cathode, said porous carbon cathode being made by the steps of:

(A) wetting the carbon black with a 1:1 to 1:3 mixture of isopropyl alcohol:water, (B) adding a binding agent thereto, (C) smearing the resulting stiff paste on a thin expanded metal screen and pressing and rolling to the desired thickness, (D) drying the cathode sheet in a vacuum oven at about 100° C. for one hour while a weight is placed above and below the cathode sheet which is sandwiched between two pieces of blotting paper, the total weight applied being sufficient for the cathode to retain structural integrity, (E) removing the weight and blotting paper and inserting the cathode sheet in an elevated drying oven at 280° C. for one hour, and (F) cooling the cathode sheet between blotting paper, repressing, and rolling.

14. An electrochemical cell according to claim 13 wherein the carbon black is a higher surface area carbon black with areas $\geq 250$ m$^2$/g.

15. An electrochemical cell according to claim 13 wherein the carbon black has a surface area $\leq 250$ m$^2$/g.

16. An electrochemical cell according to claim 13 wherein the binding agent is polytetrafluoroethylene.

17. An electrochemical cell according to claim 13 wherein the total weight applied to the cathode sheet is between about 0.1 lb per square inch of cathode sheet to about 2 lbs per square inch of cathode sheet.

* * * * *